(12) United States Patent
Wyman et al.

(10) Patent No.: US 9,424,624 B2
(45) Date of Patent: Aug. 23, 2016

(54) SYSTEM AND METHOD FOR GRAPHICS UPSCALING

(71) Applicant: Broadcom Corporation, Irvine, CA (US)

(72) Inventors: Richard Hayden Wyman, Sunnyvale, CA (US); Jaewon Shin, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 431 days.

(21) Appl. No.: 13/910,176

(22) Filed: Jun. 5, 2013

(65) Prior Publication Data

US 2014/0313231 A1   Oct. 23, 2014

Related U.S. Application Data

(60) Provisional application No. 61/815,259, filed on Apr. 23, 2013.

(51) Int. Cl.
*G09G 5/00*   (2006.01)
*G06T 3/00*   (2006.01)

(52) U.S. Cl.
CPC .................................. *G06T 3/0056* (2013.01)

(58) Field of Classification Search
None
See application file for complete search history.

(56) References Cited

U.S. PATENT DOCUMENTS

| | | | |
|---|---|---|---|
| 2003/0090592 A1* | 5/2003 | Callway | G09G 5/006 348/581 |
| 2005/0088385 A1* | 4/2005 | Elliott | G06T 3/4007 345/87 |
| 2013/0121568 A1* | 5/2013 | Krishnan | G06T 3/4053 382/162 |

* cited by examiner

*Primary Examiner* — David H Chu
(74) *Attorney, Agent, or Firm* — Brinks Gilson & Lione

(57) ABSTRACT

Systems and methods for upscaling graphics resolution are provided. The systems and methods may selectively upscale graphics frames having a first resolution to a second resolution by various scaling methods. Depending on a variety of factors, at least a first mode of upscaling and a second mode of upscaling may provide for improved upscaling on a variety of graphics data.

20 Claims, 6 Drawing Sheets

SYSTEM AND METHOD FOR GRAPHICS UPSCALING

CROSS REFERENCE TO RELATED APPLICATIONS

This application claims the benefit of U.S. Provisional Patent Application No. 61/809,510 filed Apr. 8, 2013, the content of which is hereby incorporated by reference in its entirety.

1. TECHNICAL FIELD

The present invention relates generally to a system and method for upscaling graphics resolution and more specifically to a system and method for selectively upscaling graphics resolution.

2. BACKGROUND

Graphics rendering for high resolution video formats is becoming increasingly time consuming and requires additional processing resources. As the resolution of video devices continues to increase, rendering graphics in high resolution for display may present challenges.

DETAILED DESCRIPTION

Figure 1:
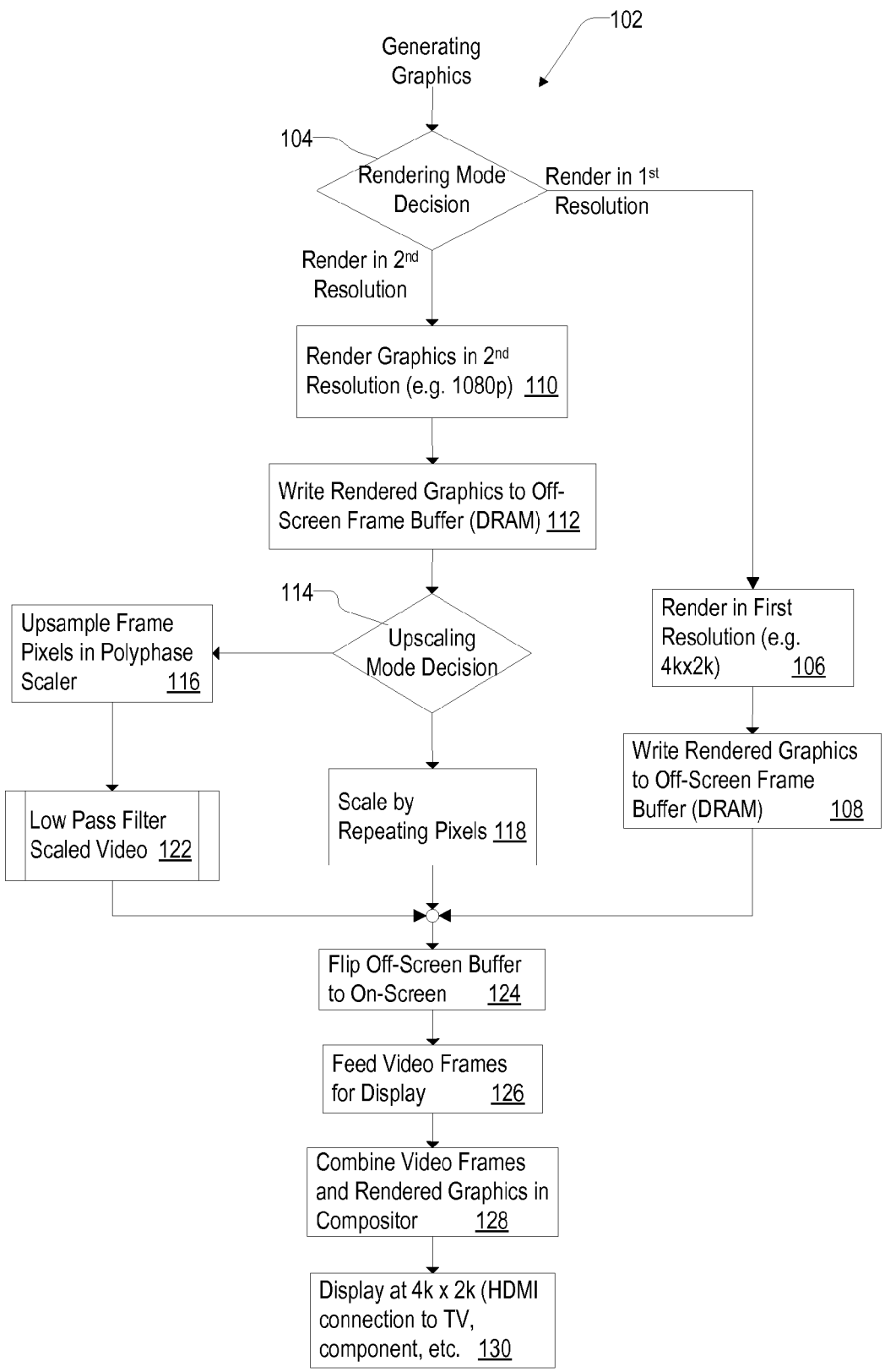
FIG. 1 is a flowchart of a method for selectively upscaling graphics resolution.

Referring to FIG. 1, a method for selectively upscaling graphics is shown in accordance with the teachings of the disclosure. The method 102 for selectively upscaling graphics resolution may begin upon a request to render graphics. The method may determine whether to render the graphics in a first resolution or to render the graphics in a second resolution and upscale the graphics to the first resolution (104). In cases where the first resolution is higher than the second resolution, rendering graphics in the first resolution may require more processing capacity than rendering graphics in the second resolution. In one implementation, the first graphics resolution may comprise 3840×2160 pixel resolution (4k×2k) and the second resolution may comprise 1920×1080 pixel resolution (1080p). The determination of rendering in 4k×2k or rendering in 1080p may be made in response to a variety of processing parameters substantially relating to the capacity of a graphics processing unit.

Some processing parameters that may be applied to determine whether to upscale the graphics to a target resolution or to render graphics in the 4k×2k resolution may comprise one or any combination of the following: memory parameters, bandwidth parameters, a graphics source, a graphics format, or the processing capacity of a system. In cases where the processing parameters are limited, the method may elect to render the graphics in 1080p and upscale the graphics. In some instances, upscaling may be applied in order to preserve memory or a system capacity based on a usage priority defined in the system (e.g. some processing requirements may be critical to maintain operation or avoid delays in displaying graphics). The method may also upscale graphics in order to preserve processing based on a user preference and/or based on power saving preferences.

If it is determined that the graphics will be rendered in 4k×2k based on the processing parameters, the method may render the graphics in 4k×2k resolution (106). This determination may generally be made if the processing capacity of the various processing parameters is sufficient to render the graphics in 4k×2k without slowing or delaying the rendered graphics for display. As the rendered graphics are generated, the rendered graphics data may be written to an off-screen buffer in DRAM for storage until the graphics are generated and ready to be displayed on a display unit (108).

If it is determined from the processing parameters that the graphics will be rendered in 1080p and upscaled to 4k×2k, the graphics may first be rendered in 1080p (110). Rendering the graphics in 1080p rather than 4k×2k may be selected when graphics generation is requested and at least one processing parameter reports inadequate processing capacity for rendering in 4k×2k. The graphics rendered in 1080p may then be written to an off-screen frame buffer in memory until the graphics data is sufficiently buffered for upscaling (112). With the rendered graphics data buffered in the off-screen frame buffer the method may continue by determining an upscaling mode to scale the graphics.

In this general implementation, it may be determined whether to upscale the graphics data by a first mode or a second mode (114). In general, the upscaling modes may comprise upscaling the graphics stream by a polyphase mode or a pixel repeating mode (116 or 118). The decision to upscale the graphics by the polyphase mode or the pixel repeat mode may be made in response to one or more scaling factors. Some examples of scaling factors may comprise a source of the graphics stream, the frequency content associated with the graphics data, or the scaling factor for upscaling that must be applied to reach the target resolution. Other examples of scaling factors may include application specific scaling or user defined scaling.

In general, the polyphase scaling mode may be applied in cases where graphics comprise a majority of low frequency pixel content or in cases where the graphics frames may be scaled by a fractional scaling factor in order to match a target resolution. Low frequency graphics content may be associated with photos, images, and landscapes corresponding to smooth transitions in the graphics. High frequency content may refer to rendered text, visual effects, and other graphics corresponding to abrupt transitions in the graphics. By selectively activating the polyphase scaling mode or the pixel repeating scaling mode, the method may apply the most effective mode specific to the graphics rendered to preserve the perceived graphics quality for a viewer.

Polyphase scaling, as referred to herein, may generally comprise processing the graphics data through a polynomial function comprising a number of filter coefficients that may be applied to selectively scale and expand the native pixel content of the graphics data. Polyphase scaling may comprise processing the graphics data through a plurality of filter coefficients to simulate additional pixel content. For this reason, polyphase scaling may be better suited to scaling the native resolution of each frame by a fractional scaling factor. Unlike pixel repeating methods of scaling, polyphase scaling may simulate pixel content rather than duplicating existing pixel content. Polyphase scaling may also be better suited to scaling graphics data comprising natural video and pictures (e.g. real-world scenes) as opposed to synthetic video and pictures. Natural video and pictures may comprise significant low frequency content often defining smooth transitions among the various features of the graphics data.

Pixel repeating scaling may generally comprise up-sampling the individual pixels of the rendered graphics by repeating existing pixels. Pixel repeating may serve to upscale graphics having high frequency content and generally comprising abrupt transitions. Due to the simple nature of the pixel repeating mode of upscaling, the pixel repeating method may be well suited upscaling graphics by whole number scaling factors, and in cases where a graphics frame comprises synthetic video and pictures such as text and other graphics that are computer generated. Synthetic video and pictures may comprise significant high frequency content. High frequency content among the pixels of the rendered graphics may generally be found in frames comprising significant text content or other rendered visual effects.

In the case that the graphics stream is upscaled by the polyphase scaling mode, a low pass filter may be applied to the scaled graphics before continuing to process the graphics for display (122). The low pass filtering may also be combined with the polyphase scaling of step 116. For example, an image comprising significant natural pixel content may be upscaled by interspersing the original pixels with a plurality of zero values. The low pass filtering may then be applied to make the interspersed zero values consistent with the original pixel data. By identifying whether a graphics stream comprises high or low frequency content or needs to be scaled by a whole or fractional scaling factor, the method may accurately upscale a graphics stream to a target resolution while optimizing the quality of the upscaled graphics.

Once the rendered graphics have been scaled to a target resolution, (e.g. 4k×2k), the rendered graphics data may be written to an off-screen buffer in DRAM for storage until the graphics are generated and ready to be displayed on a display unit. At this step, the method may continue similarly for the graphics rendered directly in 4k×2k resolution and the graphics rendered in 1080p. Once the graphics rendering is complete, and the graphics have been buffered to the off-screen buffer, the off-screen buffer may be flipped to an on-screen buffer in DRAM (124). When the buffer is flipped to the on-screen mode, the process may continue to feed the rendered graphics data to a compositor (126). In the compositor, the rendered graphics may be combined with video frames to generate composite image frames including the rendered graphics and video frames of a video feed for display (128). The composite image frames may then be output to a display unit via video output compatible with the video display (e.g. HDMI, etc.) (130).

In this implementation, the graphics may be upscaled from 1080p to 4k×2k to reduce the amount of processing required to render the graphics directly in 4k×2k. Upscaling graphics rendered in 1080p resolution to 4k×2k resolution may involve multiplying both the vertical resolution component and the horizontal resolution component of the 1080p resolution by two. In this instance, applying upscaling by the pixel repeating mode may be preferable, due to the whole number scaling factor of two in both the horizontal and the vertical directions. In some cases, it may be preferable to upscale the 1080p graphics stream by a polyphase scaling method, especially if the 1080p graphics contain significant low frequency pixel content. Though the graphics resolution of 1080p and 4k×2k are referred to in this example, other graphics resolutions may be rendered and selectively upscaled to other target resolutions in accordance with this disclosure.

The polyphase mode and pixel repeating mode may further be varied while generating graphics based on the frequency content or desired upscaling factor to be applied to a particular set of graphics for display. The method may be optimized by changing the scaling mode based on the particular set of graphics to be rendered. For example, the scaling mode may be changed based on changes in content (e.g. photographic or text) and changes in the pixel frequency distribution. Though pixel repeating and polyphase scaling modes are discussed at length herein, other methods of scaling and processing for upscaling graphics may be applied in combination with the methods disclosed.

Figure 2:
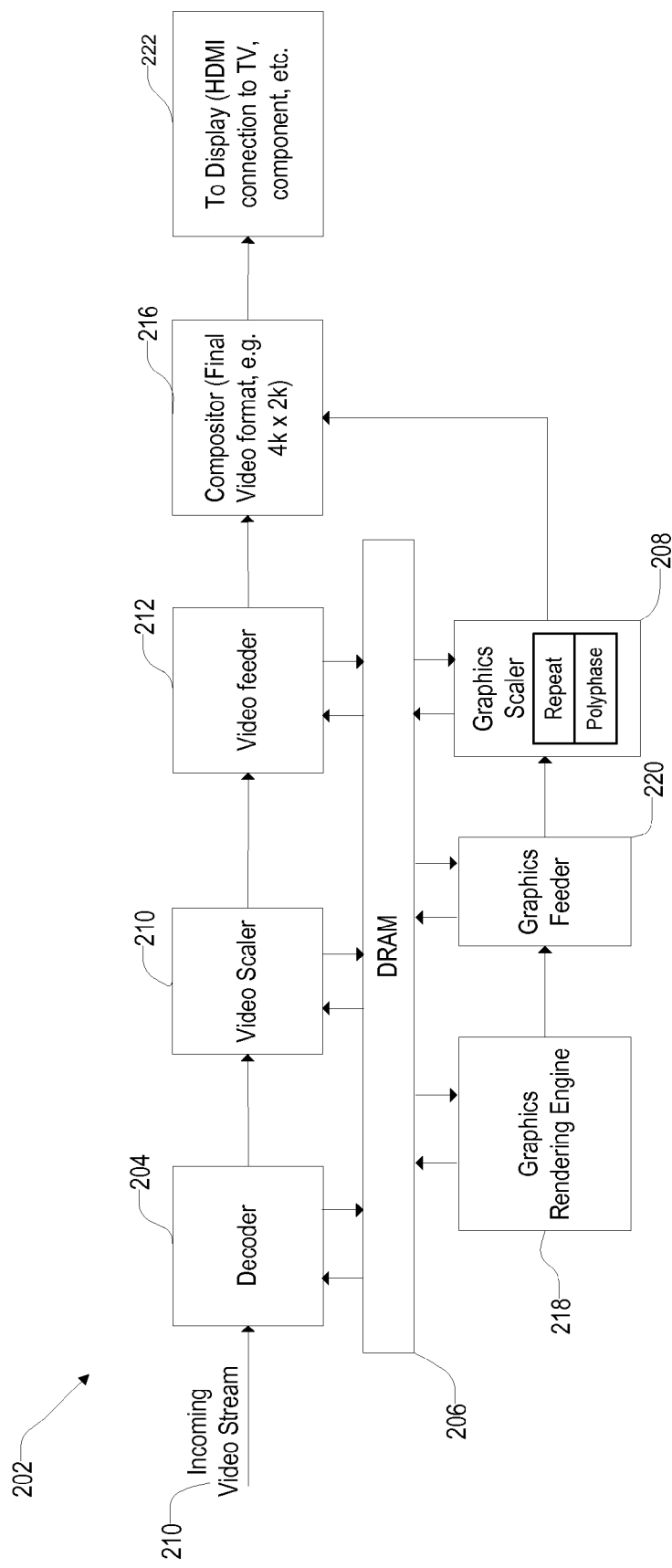
FIG. 2 is a block diagram of an implementation of a system for upscaling graphics resolution.

Referring now to FIG. 2, a block diagram of an implementation of a system for upscaling graphics resolution is shown in accordance with the disclosure. The graphics upscaling system 202 may generally comprise a decoder 204, a memory unit 206, and a graphics scaler 208. The general operation of the system may comprise the decoder 204 decompressing and decoding an incoming video stream and buffering a plurality of video frames of the video stream in the memory unit 206. Once each frame of the video stream has been buffered into the memory unit 206, a video scaler 210 may scale each frame to a first resolution. A video feeder 212 may then feed each video frame to a compositor 214 to add additional rendered graphics and enhancement information to each video frame.

Corresponding to the method discussed in FIG. 1, the system may generate rendered graphics in a graphics rendering engine 218 in response to a request to display rendered graphics. Examples of requests to display rendered graphics may comprise activating a menu, changing a channel, browsing a channel guide, displaying a photo or video, and other requests that may result in the display of rendered graphics. In response to a request to render graphics, the system may first determine whether to generate graphics in the first resolution or a second resolution. The first resolution may define a higher pixel resolution than the second resolution. The decision to render the graphics in the first resolution or the second resolution may depend on plurality of performance parameters that may correspond to the capacity of the various components of the system 202 or other parameters of components external to the system.

If it is determined that the system 202 will render the graphics in the first resolution, the graphics rendering engine 218 may render the graphics in the first resolution. The rendered graphics may then be supplied to the compositor 214 by the graphics feeder 220 where the compositor 216 may combine the graphics with the each video frame for display. If it is determined that the system 202 will render graphics in the second resolution, the graphics rendering engine 218 may render the graphics in the second resolution in order to preserve processing capacity and other performance related parameters. Accordingly, the second resolution may be lower than the first resolution. At this stage the graphics may further be upscaled to the first resolution by a pixel repeating mode or a polyphase mode in the graphics scaler 208.

Upon completion of rendering the graphics, the graphics feeder 220 may supply the graphics rendered in the second resolution to the graphics scaler 208. The graphics scaler 208 may then upscale the graphics by a pixel repeating mode or a polyphase mode. The pixel repeating mode or the polyphase mode may generally be applied based on a desired scaling ratio or the frequency distribution of the pixel content corresponding to a particular application or data source. The scaling mode applied by the graphics scaler 208 may change in response to various instructions or signals provided to the video scaler. Some examples of instructions to determine the scaling mode may include information programmed in the system providing the preferred method of graphics upscaling for a particular device, data file type, and data sources.

The scaling mode applied by the graphics scaler 208 may be controlled by the graphics rendering engine 218, internal control circuitry, an external controller, or other circuitry. In one implementation, the scaling mode may be controlled by an integrated circuit or processor capable of identifying either the frequency content distribution of the graphics. Multiple methods of identifying information regarding the mode of upscaling may be applied in addition to the methods described herein without departing from the spirit of this disclosure. Once the graphics have been scaled by the graphics scaler 208, the graphics feeder 220 may supply the scaled graphics to the compositor 216. The scaled graphics may then be combined with the video frames and assembled in a compositor 216 for display 222.

The combined video frames and graphics may be output to the display 222 by any video connection relevant to the particular application of the graphics scaling system or display device. The video connection may comprise an HDMI graphics connection, component video, A/V, composite, co-axial, or any other connection compatible with a particular video display. The memory unit 206 may comprise any memory capable of storing digital information, for example random access memory (RAM) or dynamic random access memory (DRAM). The graphics scaler 208 in this implementation may comprise a single graphics scaling unit configured to upscale graphics frames by a pixel repeating or a polyphase mode of upscaling. In other implementations, the graphics scaler 208 may comprise one or more graphics scaling units, each configured for a particular scaling mode.

Figure 3:
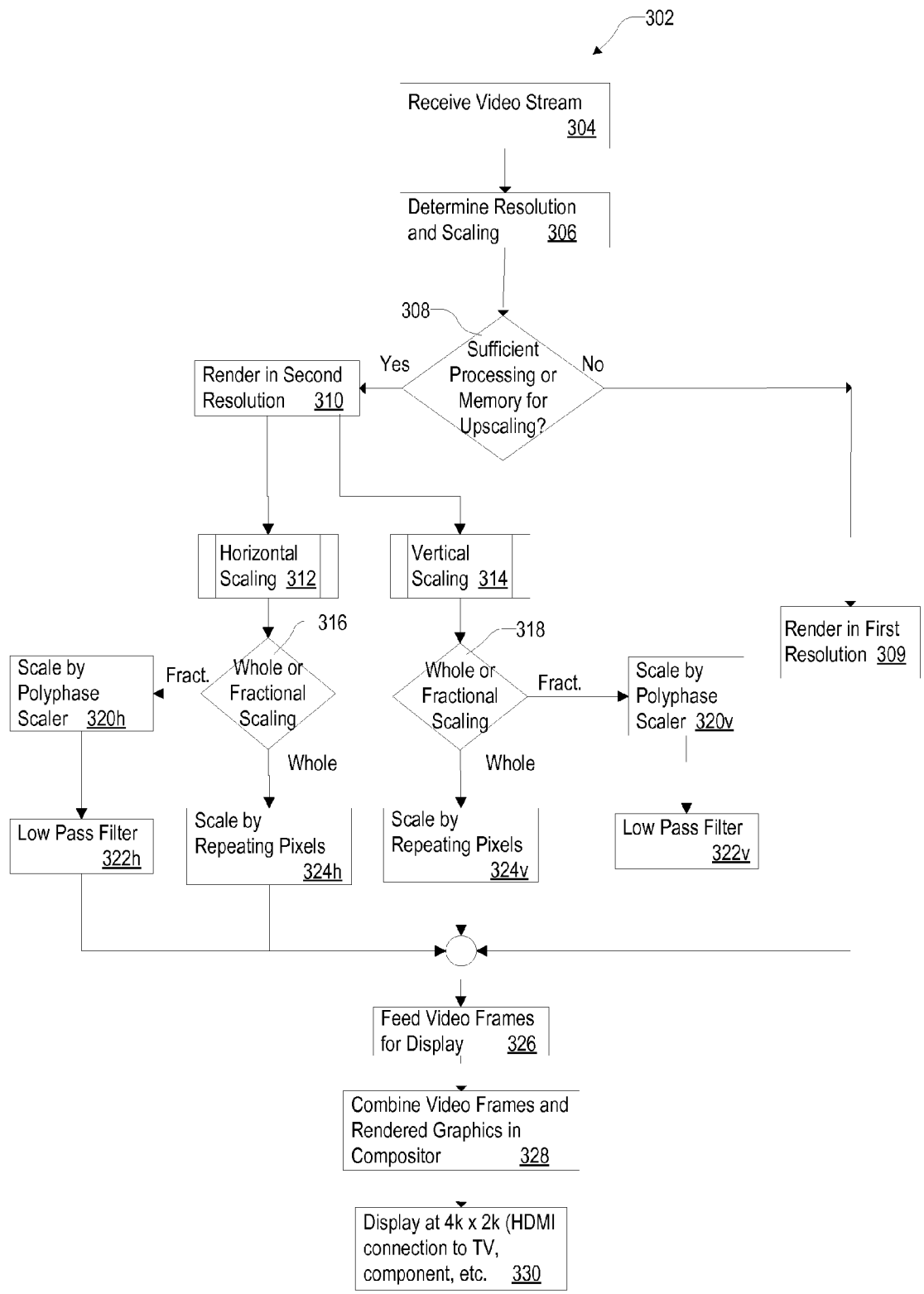
FIG. 3 is a flowchart of a method for upscaling graphics resolution independently for a vertical resolution component and a horizontal resolution component.

Referring now to FIG. 3, a method 302 for selectively upscaling a graphics stream based on a processing capacity is shown in accordance with the teachings of the disclosure. The method may be initialized in response to a request to display graphics data (304). Graphics data may comprise graphics from a plurality of internal and external sources. Some examples of graphics data may include user menus, program guides, video and photographic data, and a plurality of software applications. Upon a request to display graphics, the method may buffer the graphics data into an off-screen buffer similar to the method introduced in FIG. 1. The graphics data may then be analyzed to determine the resolution of the data received and the scaling factor required to display the graphics at a first resolution (306).

Next it may be determined if there is sufficient processing capacity to render the graphics data in the first resolution (308). The determination of sufficient processing capacity may be determined during a system definition process completed during system startup or initialization. The determination of sufficient processing capacity may also be updated during the method 302. The system definition process may comprise a system identifying system resources, for example processing capacity, decoding capacity, memory capacity, etc. The decision of whether to upscale the graphics data or render the graphics data in the first resolution may depend on a plurality of factors and parameters or any combinations thereof.

Examples of some processing parameters that may be applied to determine if the processing capacity is sufficient may include available memory, processing capacity, a user defined format for the graphics data, or a current processing workload of a particular system or system component. The available memory and a corresponding memory usage may comprise a memory bandwidth, such as a DRAM bandwidth, and a memory footprint. The memory footprint may comprise an amount of memory, such as the amount of memory required render graphics in a first resolution.

If it is determined that there is sufficient processing or memory capacity for upscaling, the method may continue to render the graphics in the first resolution (309). If the method determines that there is not sufficient processing capacity, the method may continue to render the graphics data in a second resolution and upscale the rendered graphics to the first resolution (310). After the graphics are rendered in the second resolution, the horizontal and vertical resolution may be upscaled independently (312, 314). A scaling decision may be made to upscale the horizontal resolution by a first factor and the vertical resolution by a second factor. The scaling factors for the horizontal and vertical resolutions may further be determined in parallel.

Once the scaling factors are determined, the scaling process may be completed sequentially or in parallel for the horizontal and vertical resolutions. Sequential scaling may comprise scaling in a first direction (e.g. horizontal) and then scaling in a second direction (e.g. vertical). In sequential scaling, the horizontal or vertical resolutions may be scaled first or second depending on a plurality of factors. Parallel scaling may comprise a two-dimensional scaling method that may be applied to scale the horizontal and vertical directions simultaneously. Other scaling methods may also be implemented without departing from the spirit of this disclosure.

The scaling factor of a graphic may depend on the relationship of the first resolution and the second resolution. Whole or fractional scaling of the horizontal resolution and the vertical resolution of the graphics may be applied separately to match the first resolution. Once the scaling factor is determined, the method may apply a whole or fractional scaling factor to the horizontal resolution component (316). Further, a whole or fractional scaling factor may be applied to the vertical resolution component (318).

A polyphase mode of scaling may generally be applied to graphics that require the application of a whole or fractional scaling factor to match a target resolution (320). The polyphase scaling mode may also be followed by processing the scaled graphics frame with a low pass filter (322). The low pass filtering may also be combined with the polyphase scaling. The pixel repeating scaling mode may generally be applied to graphics streams requiring a whole number scaling factor to reach a target resolution (324).

After the graphics have been rendered in the first resolution or rendered in the second resolution and scaled, the method may continue to feed graphics frames for display to the compositor (326). In the compositor, the graphics may be combined with video frames (328). The graphics may then be displayed at the first resolution with the video frames (330). Variations of the systems and methods disclosed herein may incorporate various processing systems and methods that may apply various electrical components to process graphics data without departing from the spirit of the disclosure.

Figure 4:
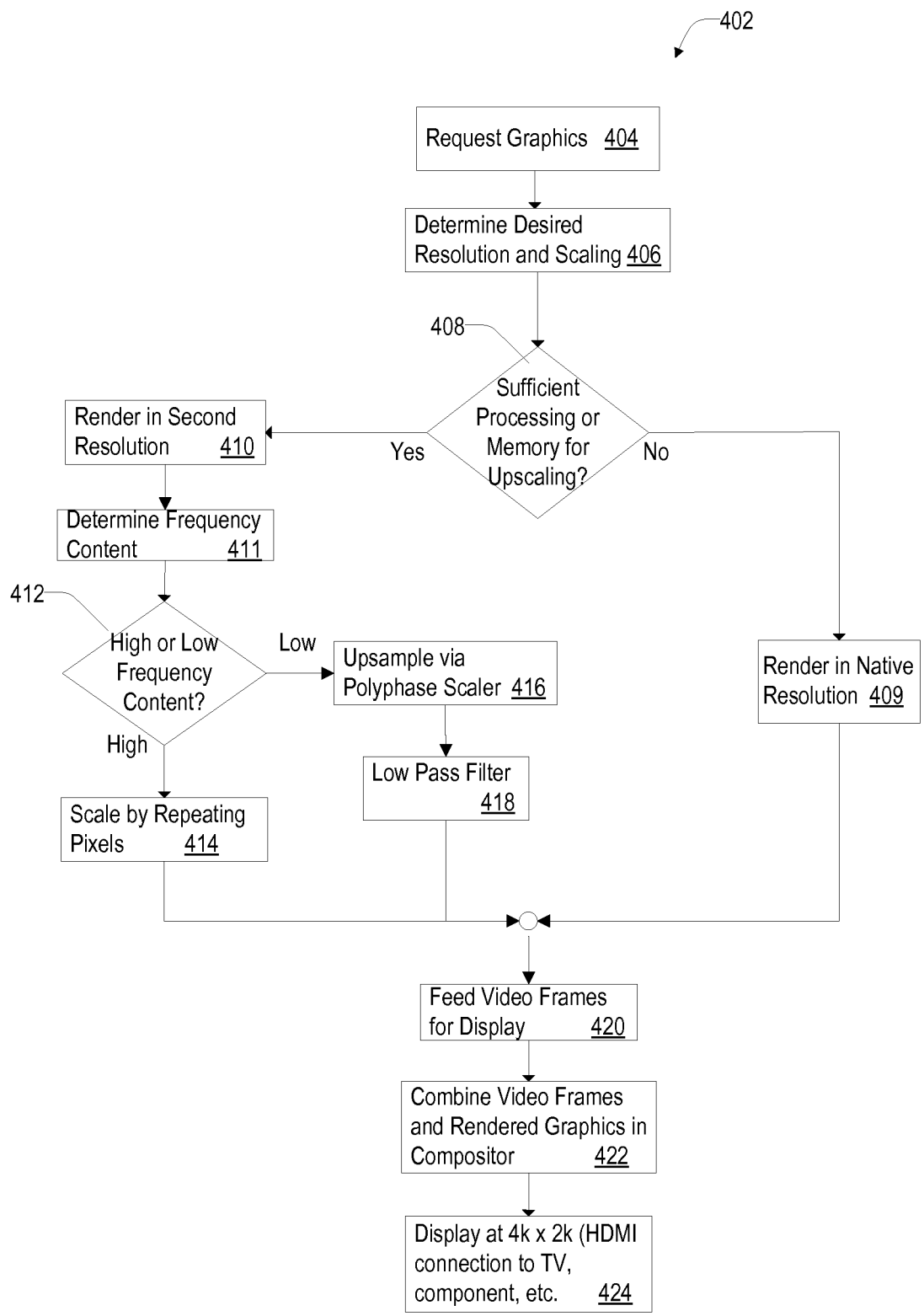
FIG. 4 is a flowchart of a method for upscaling graphics resolution based on frequency content.

Referring now to FIG. 4, a flowchart of a method (402) for upscaling graphics based on frequency content is shown in accordance with the teachings of the disclosure. The method may be initialized in response to a request to display graphics data similar to that discussed in reference to FIGS. 1 and 3 (404). The method may continue to determine the desired resolution and scaling required for the graphics (406). Prior to rendering the graphics, the method may determine whether to upscale the graphics data or render the graphics in a first resolution (408).

The decision of whether to upscale the graphics data or render the graphics data in the first resolution may depend on a plurality of factors and parameters or any combinations thereof. Examples of some processing parameters that may be applied to determine if the processing capacity is sufficient may include available memory, processing capacity, a user defined format for the graphics data, or a current processing workload of a particular system or system component. The available memory and a corresponding memory usage may comprise a memory bandwidth, such as a DRAM bandwidth, and a memory footprint. The memory footprint may comprise an amount of memory, such as the amount of memory required render graphics in a first resolution.

If it is determined that there is sufficient processing or memory capacity for upscaling, the method may continue to render the graphics in a first resolution (409). If the method determines that there is not sufficient processing capacity, the method may continue to render the graphics data in a second resolution (410). The graphics may then be analyzed to determine a pixel frequency distribution (411). A number of analysis methods may be applied to determine the frequency distribution of the graphics. Some examples of frequency analysis methods may comprise Fourier transforms, wavelet transform, and other similar frequency analysis methods to determine frequency content of graphics The frequency analysis may be applied to determine the range of the frequency content of the graphics and whether the frequency is above or below a configurable or predefined threshold. The graphics may be processed by a plurality of image analysis techniques to determine whether the frequency content of the graphics is within a configurable range. It may also be determined if the frequency content is above or below a configurable threshold (412).

In one implementation, a threshold value may be set to define what may comprise high frequency content graphics or low frequency content graphics. In another implementation, a separate threshold may be set to define a high threshold and a low threshold to distinguish high and low frequency content. For graphics frames having frequency content significantly between the high and low thresholds, the mode of graphics scaling may be determined by other factors, for example, the source of the graphics stream, the scaling ratio or any other scaling factors discussed in this disclosure. The determination of the frequency content of a sample of the rendered graphics may also be used to determine the frequency content of the graphics.

Once it is determined that a sequence of graphics frames is considered to contain significant high or a low frequency content, the method may continue to upscale the graphics by a pixel repeating or a polyphase scaling mode respectively (414, 416). Similar to the other methods discussed herein, polyphase upscaling may be followed by a low pass filter to smooth high frequency content in the graphics (418). The low pass filtering may also be combined with the polyphase scaling. After the graphics have been rendered in the first resolution or rendered in the second resolution and scaled, the method may continue to feed graphics frames for display to the compositor (420). In the compositor, the graphics may be combined with video frames (422). Further, the graphics may be displayed at the first resolution with the video frames (424).

Figure 5:
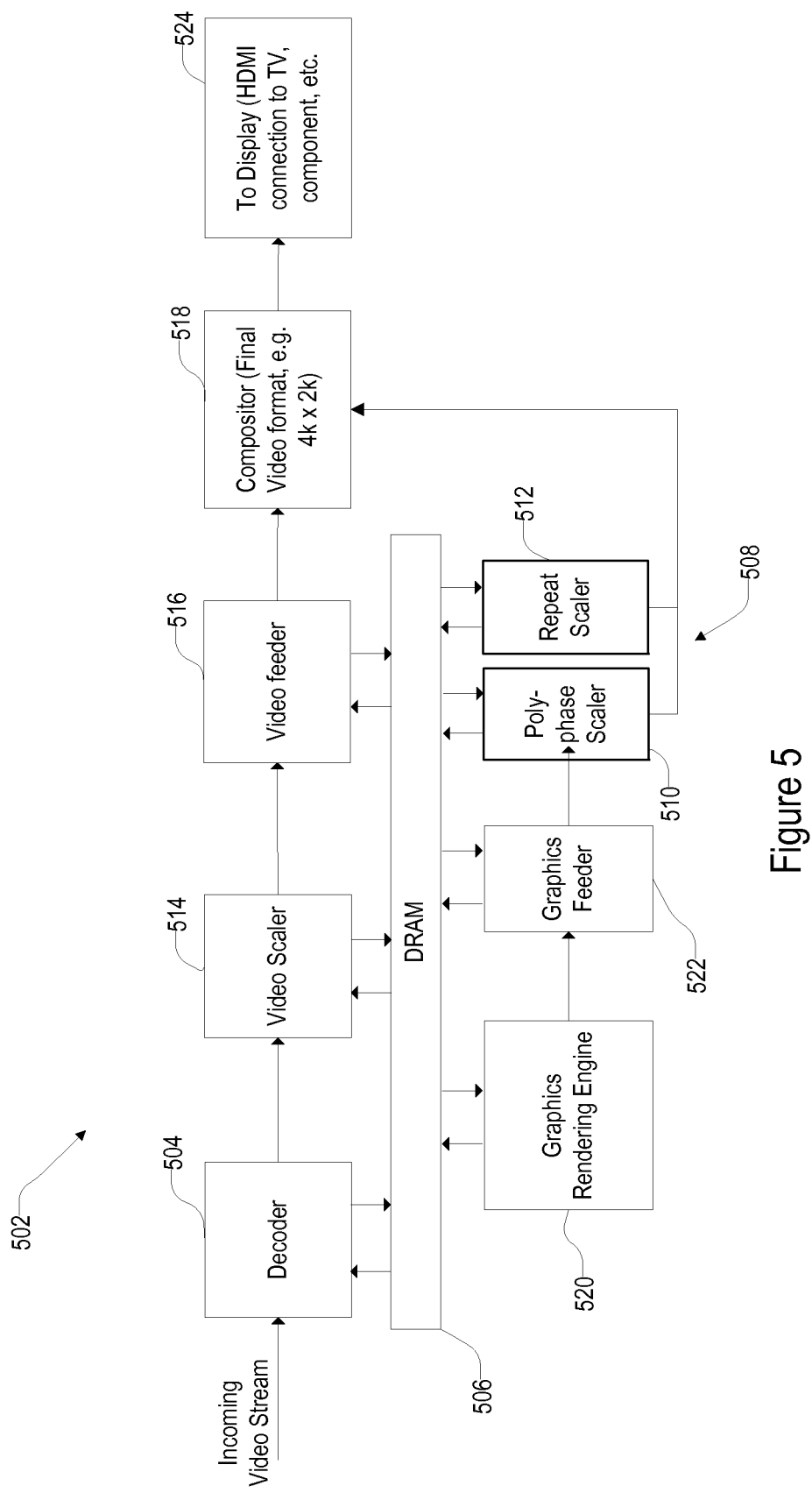
FIG. 5 is a block diagram of an implementation of a system for upscaling graphics resolution.

Referring now to FIG. 5, a block diagram of a system 502 for upscaling graphics is shown in accordance with the teachings of the disclosure. Similar to the graphics upscaling system 202, the system 502 may generally comprise a decoder 504, a memory unit 506 and a graphics scaler 508. The graphics scaler 508 in this implementation may comprise a first 510 and a second 512 graphics scaling unit. The first graphics scaling unit 510 may be configured to upscale graphics frames by pixel repeating and the second graphics scaling unit 512 may be configured to upscale graphics frames by polyphase scaling. In this implementation, each graphics scaling unit 510, 512 may be dedicated to a particular form of graphics scaling to improve efficiency.

The general operation of the system may comprise the decoder 504 decoding an incoming video stream and buffering a plurality of video frames of the video stream in the memory unit 506. Once each frame of the video stream has been buffered into the memory unit 506, a video scaler 514 may scale each frame to a first resolution. A video feeder 516 may then feed each video frame to a compositor 518 to add additional rendered graphics and enhancement information to each video frame.

Corresponding to the methods discussed in reference to FIGS. 1, 3 and 4, the system may generate rendered graphics in a graphics rendering engine 520 in response to a request to display rendered graphics. In response to a request to render graphics, the system may first determine whether to generate graphics in the first resolution or a second resolution. The decision to render the graphics in the first resolution or the second resolution may depend on plurality of performance parameters that may correspond to the capacity of the various components of the system 502 or other parameters of components external to the system.

If it is determined that the system 502 will render the graphics in the first resolution, the graphics rendering engine 520 may render the graphics in the first resolution. The rendered graphics may then be supplied to the compositor 518 by a graphics feeder 522 where the compositor 518 may combine the graphics with the each video frame for display. If it is determined that a system will render graphics in the second resolution, a graphics rendering engine may render the graphics in the second resolution in order to preserve processing capacity and memory. At this stage the graphics may be upscaled to the first resolution by a pixel repeating mode or a polyphase mode in a graphics scaler.

Upon completion of rendering the graphics, the graphics feeder 522 may supply the graphics rendered in the second resolution to the graphics scaler 508. The graphics scaler 508 may then upscale the graphics by a pixel repeating mode or a polyphase mode. The scaling mode applied by the graphics scaler 508 may change in response to various instructions or signals provided to the video scaler. Once the graphics have been scaled by the graphics scaler 508, the graphics feeder 522 may supply the scaled graphics to the compositor 518. The scaled graphics may then be combined with the video frames, assembled in the compositor 518, and output for display via a video connection 524.

Figure 6:
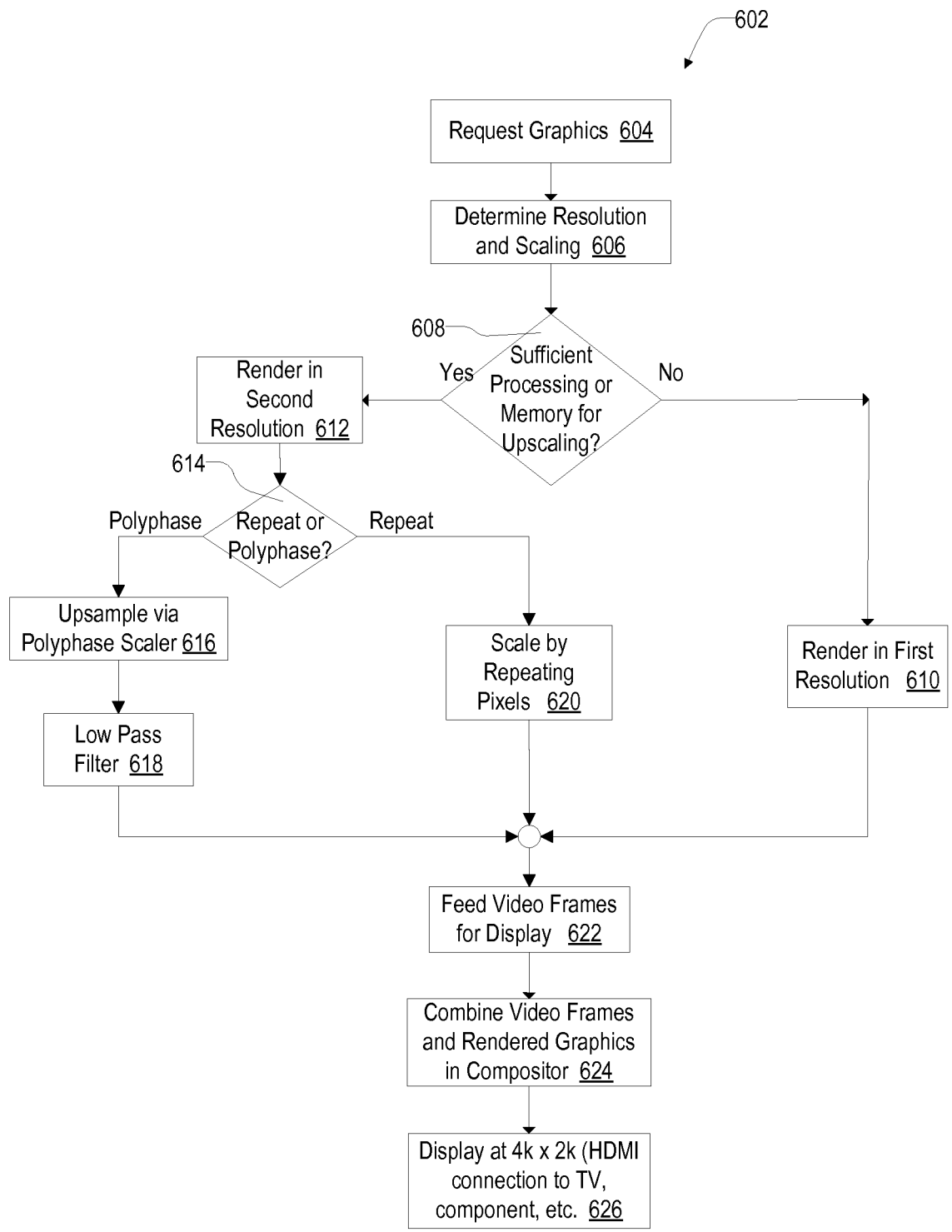
FIG. 6 is a flowchart of a method for upscaling graphics based on a source of the graphics.

Referring now to FIG. 6, a flow chart of an application or source specific method for upscaling graphics data is shown in accordance with the teachings of the disclosure (602). The method may be initialized in response to a request to display graphics data (604). In response to the request, the method may determine the resolution and scaling of the graphics data (606). The method may then determine whether there is sufficient processing capacity to render the graphics data in a first resolution or render the graphics data at a second resolution to preserve processing capacity (608). Similar to the methods discussed previously, if the system has sufficient capacity the graphics may be rendered in the first resolution (610). The method may also render the graphics in a second resolution (612). The graphics may be upscaled based on the source or application of the graphics (614).

This method may apply a scaling mode to the graphics based on, for example, the frame originating from a specific application, source, or being input into a specific input. For instance, graphics data input through media connected to a USB port may be associated with a program used to view the graphics data. In this example, the graphics scaling mode applied may be determined from a plurality of factors. The graphics may be scaled based on the source of the data being a specific file type, by a specific input (e.g. the USB port), or by the program used to view the graphics. A mode of operation of a program may also be applied to identify the scaling mode to be applied to scale the graphics. Some examples of file types that may be upscaled using polyphase methods may include TIF, PNG, JPG, and GIF files that may correspond to photographic images. Examples of file types that may be upscaled by pixel repeating may include TXT, DOC, and CSV file types.

This method may also be applied in combination with the previously discussed methods to identify upscaling by a polyphase or pixel repeating mode (614, 616, 620). The polyphase scaling mode may be applied to graphics sources and applications that generally comprise photographic images and other graphics comprising a broad frequency distribution (616). For instance, applications related significantly to photo editing may apply the polyphase scaling mode followed by a low pass filtering (618). In other applications, a pixel repeating scaling mode may be applied to graphics comprising frequency content comprising sharp edges (620). The pixel repeating scaling mode may be especially effective in upscaling content that incorporates large quantities of rendered graphics data and text that may be more accurately upscaled by a pixel repeating mode.

The determination of the application specific scaling may also be related to an input source of the graphics data. Graphics data received in a specific graphics input may generally relate to graphics content corresponding to low or high frequency content, and be selectively upscaled based on the content associated with the input. The scaling mode may also be user defined or adjusted depending user specified conditions, sources, or frequency thresholds. Similar to the other methods disclosed herein, the method may continue to feed the graphics to the compositor (622). The rendered graphics may then be combined with video frames (624). The combined video frames and graphics may then be output to a display (626).

It is noted that the various modules and/or circuitries (e.g., encoding modules and/or circuitries, decoding modules and/or circuitries, encoder rate adaptation modules and/or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

Various aspects of the present disclosure have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow charts may also have been arbitrarily defined herein to illustrate certain significant functionality. To the extent used, the flow chart boundaries and sequence could have been defined otherwise and still perform the certain significant functionality. Such alternate definitions of both functional building blocks and flow diagram blocks and sequences are thus within the scope and spirit of the claimed disclosure.

As a person skilled in the art will readily appreciate, the above description is meant as an illustration of the principles of this disclosure. This description is not intended to limit the scope or application of this disclosure in that the disclosure is susceptible to modification, variation and change, without departing from spirit of this disclosure, as defined in the following claims.

What is claimed is:

1. A method for scaling graphics data, the method comprising:
   selectively rendering graphics data defining rendered graphics having a first resolution and a second resolution;
   upscaling the rendered graphics by a first scaling mode in response to the first resolution being a whole number multiple of the second resolution to provide processing efficiency;
   upscaling the rendered graphics by a second scaling mode in response to the first resolution being a fractional multiple of the second resolution; and
   displaying the upscaled graphics.

2. The method according to claim 1, wherein the first scaling mode comprises upscaling via a pixel repeating mode.

3. The method according to claim 2, wherein the pixel repeating mode comprises upsampling a row of existing pixels of a frame of the graphics data.

4. The method according to claim 3, wherein the pixel repeating mode comprises upsampling a column of existing pixels of a frame of the graphics data.

5. The method according to claim 1, wherein the second scaling mode comprises upscaling via a polyphase scaling method.

6. The method according to claim 1, wherein the first scaling mode and the second scaling mode are applied separately to scale a horizontal resolution component and a vertical resolution component of the rendered graphics.

7. The method according to claim 1, wherein the first resolution is 3840×2160 pixels.

8. A system for scaling graphics data, the system comprising:
   a memory unit;
   a processor being configured to receive the graphics data and buffer the graphics data to the memory unit, the processor comprising at least one module configured to:
   selectively rendering the graphics data to define rendered graphics having a first resolution and a second resolution;
   upscale the rendered graphics by a first scaling mode in response to the first resolution being a whole number multiple of the second resolution to provide processing efficiency;

upscale the rendered graphics by a second scaling mode in response to the first resolution being a fractional multiple of the second resolution; and display the upscaled graphics.

9. The system according to claim 8, wherein the first scaling mode comprises upscaling via a pixel repeating mode.

10. The system according to claim 9, wherein the pixel repeating mode comprises upsampling a row of existing pixels of a frame of the graphics data.

11. The system according to claim 10, wherein the pixel repeating mode comprises upsampling a column of existing of pixels of the frame of the graphics data.

12. The system according to claim 8, wherein the second scaling mode comprises upscaling via a polyphase scaling method.

13. The system according to claim 8, wherein the first scaling mode and the second scaling mode are applied separately to scale a horizontal resolution component and a vertical resolution component of the rendered graphics.

14. The system according to claim 8, wherein the first resolution is 3840×2160 pixels.

15. In a non-transitory computer readable storage medium having stored therein instructions executable by a programmed processor for scaling graphics data, the storage medium comprising instructions for:

selectively rendering the graphics data to define rendered graphics having a first resolution and a second resolution;

upscaling the rendered graphics by a first scaling mode in response to the first resolution being a whole number multiple of the second resolution to provide processing efficiency;

upscaling the rendered graphics by a second scaling mode in response to the first resolution being a fractional multiple of the second resolution; and displaying the upscaled graphics.

16. The computer readable storage medium according to claim 15, wherein the first scaling mode comprises upscaling via a pixel repeating mode.

17. The computer readable storage medium according to claim 16, wherein the pixel repeating mode comprises upsampling a row of existing pixels of a frame of the graphics data.

18. The computer readable storage medium according to claim 17, wherein the pixel repeating mode comprises upsampling a column of existing of pixels of the frame of the graphics data.

19. The computer readable storage medium according to claim 15, wherein the second scaling mode comprises upscaling via a polyphase scaling method.

20. The computer readable storage medium according to claim 15, wherein the first scaling mode and the second scaling mode are applied separately to scale a horizontal resolution component and a vertical resolution component of the rendered graphics.

* * * * *